UNITED STATES PATENT OFFICE.

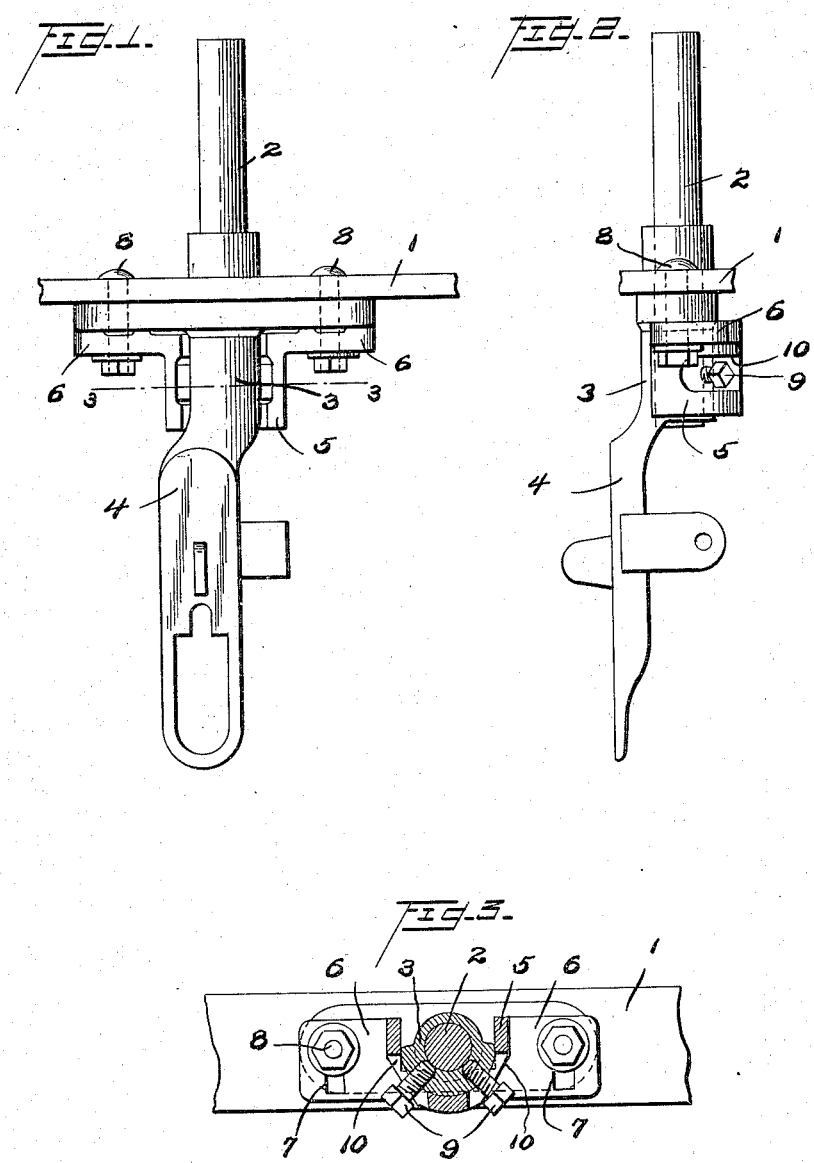

ROBERT R. CORN, OF UNION, SOUTH CAROLINA.

ROCK-SHAFT BEARING FOR LOOMS.

1,226,188.	Specification of Letters Patent.	Patented May 15, 1917.

Application filed August 11, 1916. Serial No. 114,476.

*To all whom it may concern:*

Be it known that I, ROBERT R. CORN, citizen of the United States, residing at No. 9 Mill avenue, Union, in the county of Union and State of South Carolina, have invented certain new and useful Improvements in Rock-Shaft Bearings for Looms, of which the following is a specification.

This invention relates to a bearing attachment for looms designed to prevent wear on the rock shaft.

The invention is designed for use on a Draper or similar loom but can be adapted for use on other looms.

Also by attaching the device to an old worn rock shaft avoids replacing the worn shaft with a new one, the lay working the same as if a new shaft had been put in. It also serves as a support for the lay and keeps it in perfect adjustment.

The invention consists in the novel features of construction hereinafter described, pointed out in the claims and shown in the accompanying drawings, in which:—

Figure 1 is a plan view.

Fig. 2 is a face view, the parallel bar being in cross section.

Fig. 3 is a section on the line 3—3.

In the drawing 1 represents the lower end portion of the loom frame, 2 the rock shaft, 3 the rock shaft bearing and 4 the parallel bar. The shaft 2 is of steel and the bearing 3 and bar 4 of cast iron. This causes wear between the shaft 2 and the bearing 3. This I avoid by making these parts rigid, in any suitable way, and putting in my attachment which consists of a three-quarter cast iron bearing 5 receiving the original shaft bearing 3 and which now forms merely the connecting link between the shaft 2 and the bar 4.

The bearing 5 has side wings 6 which are vertically and transversely slotted as at 7 and is adjustably secured to the frame 1 by means of bolts 8 passing through the slots 7.

On the old bearing 3, now considered as an end portion of the bar 4 are side lugs 9, which may consist of set screws inserted into the part 3. These project into and work in openings 10 cut in the bearing 5, and limit the rocking movement between the members 3 and 5.

It is of course obvious that the wear between the two cast iron members 3 and 5 will not only be less than between the steel rocker shaft 2 and the original bearing 3, but of minor importance, since my attachment can be much more quickly replaced and at much less expense than a new rock shaft. Its adjustability also permits the taking up of a certain amount of wear, and when applied to an old and worn rock shaft it will act in the same manner as if applied to a new one, thereby making the old shaft as good as the new one.

After my attachment is put in place the member 3 ceases to be a bearing for the rock shaft and becomes a coöperating member with the bearing 5.

For purposes of my invention it may be and is considered as a part of the parallel bar 4, this part of the bar then rocking in the bearing 5.

What I claim is:—

1. The combination with a rock shaft, its original bearing, and the parallel bar of a loom, of a supplemental bearing secured to a portion of the loom frame and receiving the original bearing, and means for limiting relative rocking movement between the two bearings.

2. The combination with the rock shaft and parallel bar of a loom, means connecting said shaft and bar, a bearing adapted to receive said connecting part, means for adjustably connecting said bearing to the loom frame, and means for limiting rocking movement of the said connecting part and the said bearing.

In testimony whereof I affix my signature in the presence of two witnesses.

ROBT. R. CORN.

Witnesses:
H. A. DREW,
J. B. WILLIAMS.